UNITED STATES PATENT OFFICE.

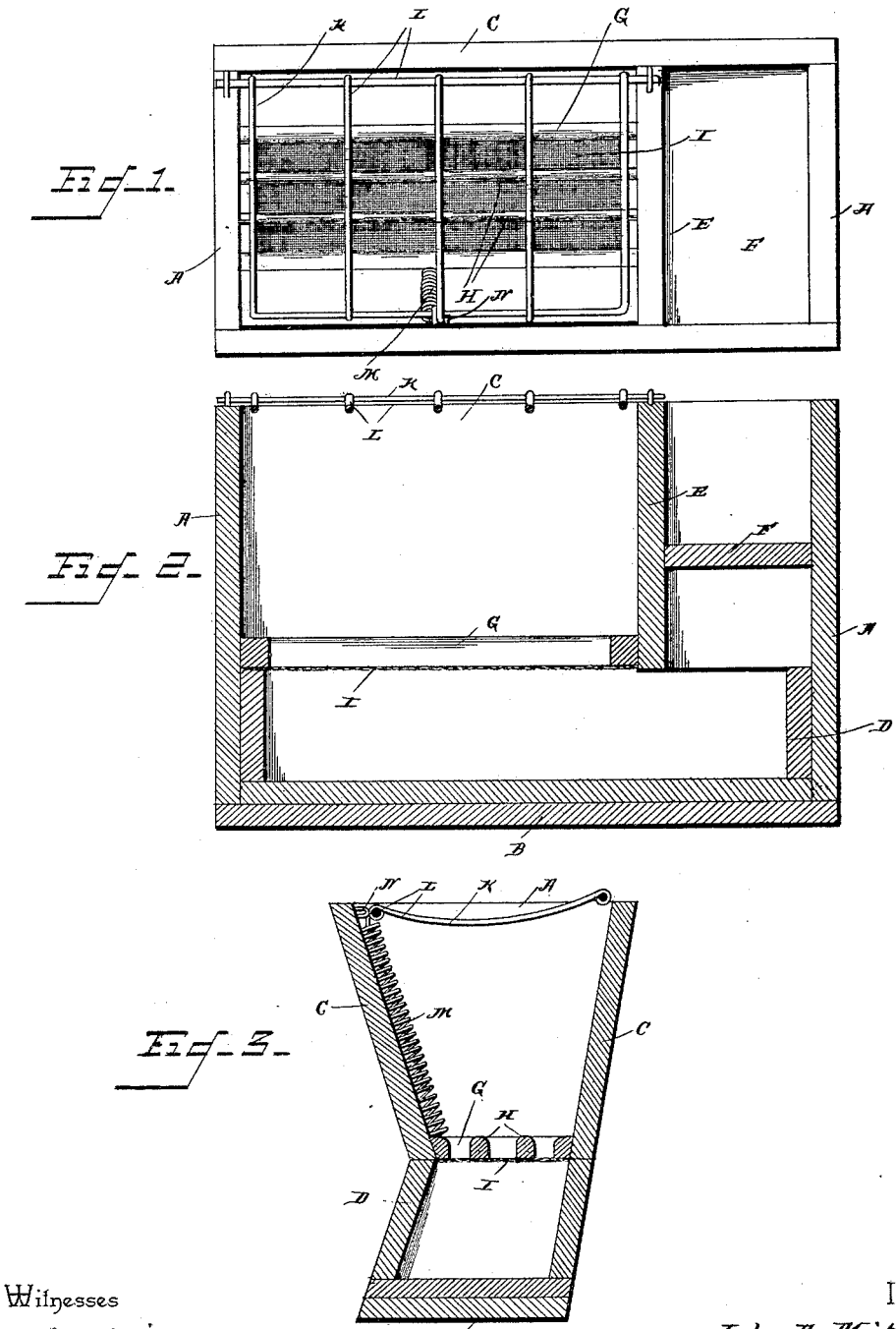

JOHN A. MITCHELL AND CHARLIE T. DEAL, OF SCOTTSBURG, INDIANA.

FEED-TROUGH.

SPECIFICATION forming part of Letters Patent No. 477,139, dated June 14, 1892.

Application filed July 5, 1889. Serial No. 316,563. (No model.)

*To all whom it may concern:*

Be it known that we, JOHN A. MITCHELL and CHARLIE T. DEAL, citizens of the United States, residing at Scottsburg, in the county of Scott and State of Indiana, have invented a new and useful Feed-Trough, of which the following is a specification.

Our invention relates to improvements in feed-troughs; and it consists in certain novel features hereinafter described and claimed.

In the accompanying drawings, Figure 1 is a plan view of the feed-trough. Fig. 2 is a longitudinal section. Fig. 3 is a transverse vertical section.

In carrying out our invention we employ the standards or end pieces A A, the lower ends of which may be connected by a base-plate B, if so desired; but this base-plate is not essential. The upper ends of the standards or end pieces are connected by the side plates C C, which are secured to the upwardly-diverging edges of the end plates and form the front and rear walls of the trough. Below these side walls and between the lower ends of the standards we arrange a horizontal drawer D, which is adapted to receive the seeds falling from the trough, and thereby prevent the loss of the same. A vertical partition E is arranged near one end of the trough and secured to the side plates C, and between the said partition and the adjacent end piece we secure the horizontal plate F, thereby forming a compartment adapted to contain meal or similar feed.

The compartment between the partition E and the farther end of the trough is adapted to contain hay, straw, or other grain, and it is provided with a screen-bottom to permit the seeds to fall into the drawer D. This screen-bottom consists of a frame G, having the longitudinal bars H and the screen-cloth I, secured to said frame. This frame is removably fitted in the bottom of the compartment, so that it can be easily taken out for the purpose of repairing or cleaning the rack. The top of this compartmet is covered by an open frame K, which is hinged to one of the side plates C and consists of a series of longitudinal and transverse rods L, as clearly shown. The frame being thus open allows an animal to feed and at the same time prevents him drawing the grain in such large quantities as to waste the same. The frame is drawn normally downward by a spring M, having its lower end secured to the side of the trough and its upper end engaging one of the rods of the frame. When the trough is being filled, the spring is disengaged from the frame and is engaged over a hook or staple N in one of the side plates of the trough at the upper edge of the same, and the frame is then swung over to one side, so as to leave the top of the trough entirely open.

From the foregoing description, taken in connection with the accompanying drawings, it will be seen that we have provided a feed-trough by the use of which small feed can be fed to the animals and at the same time grain can be supplied to them without any liability of being wasted and in such a manner that the seeds will all be saved. As the animal draws the grain from the trough the open frame K strips it of the seeds, which then fall to the bottom of the trough and pass through the screen into the drawer. When a sufficient quantity of seeds have been collected in the drawer, they are removed in the usual manner.

Having thus described our invention, what we claim, and desire to secure by Letters Patent, is—

The herein-described feed-trough, comprising the body C, the wire frame H, hinged to the top of the body and consisting of a series of transverse bars, said frame being of a size sufficient to close the mouth of the feed-trough and swing downwardly therein, a removable screen-frame in the bottom of the feed-trough, and the spring M, arranged within the interior of the feed-trough and connected therewith so as to force the wire frame downwardly as the feed within the trough is removed, substantially as described.

In testimony that we claim the foregoing as our own we have hereto affixed our signatures in presence of two witnesses.

JOHN A. MITCHELL.
CHARLIE T. DEAL.

Witnesses:
BARTON A. ERVINE,
WILLIAM H. SIERP.